May 13, 1958
G. C. SUMMERS
2,834,421
LOW NOISE LEVEL ACOUSTIC LOGGING SYSTEM
Filed Jan. 7, 1954
2 Sheets-Sheet 1
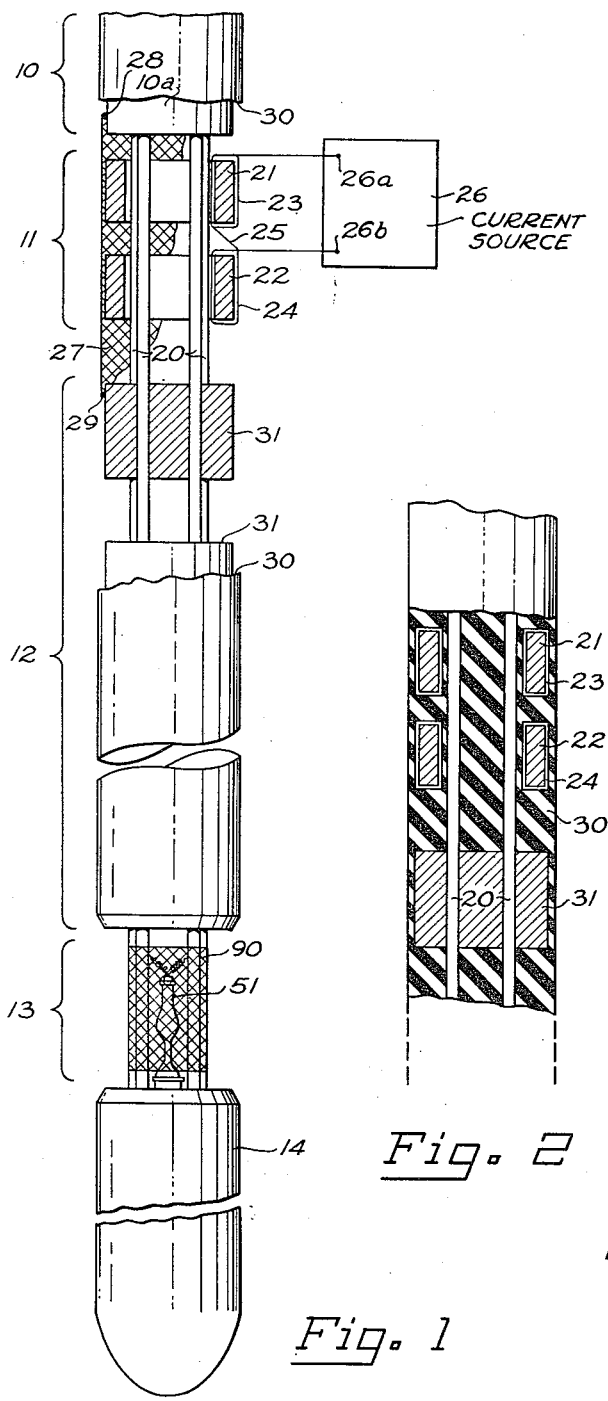
Fig. 1
Fig. 2
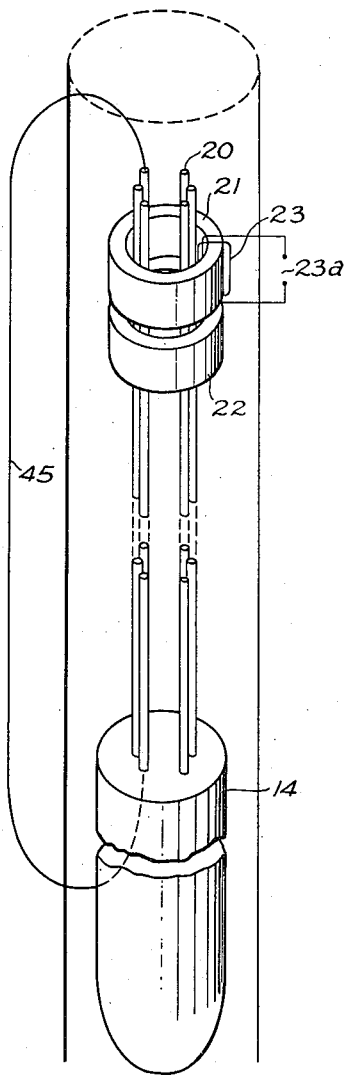
Fig. 3
GERALD C. SUMMERS
INVENTOR.
BY D. Carl Richards
ATTORNEY

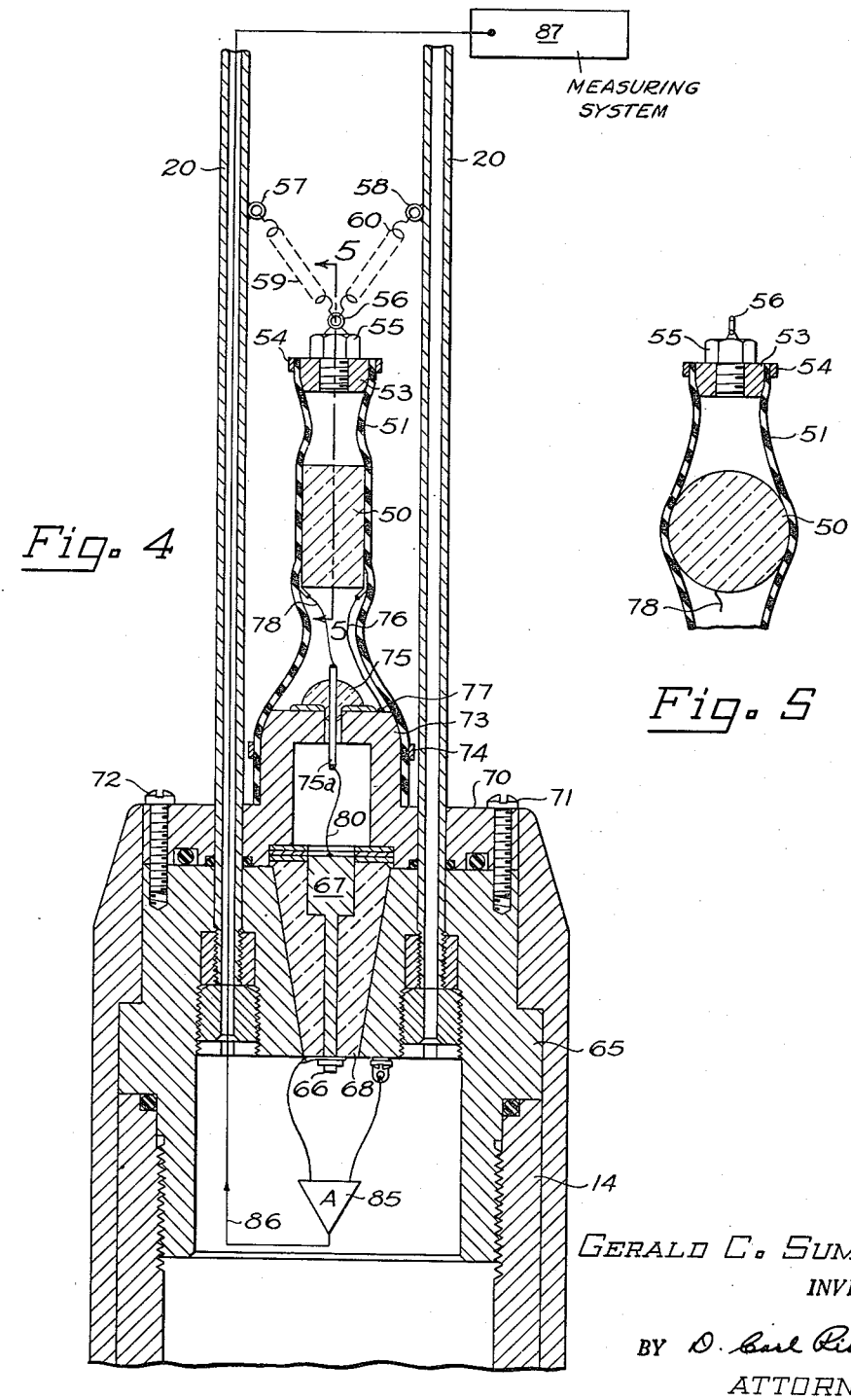

2,834,421
LOW NOISE LEVEL ACOUSTIC LOGGING SYSTEM

Gerald C. Summers, Dallas, Tex., assignor to Socony Mobil Oil Company, Inc., a corporation of New York Application January 7, 1954, Serial No. 402,798

10 Claims. (Cl. 181—.5)

This invention relates to an acoustic well logging system and more particularly to a method and system for achieving a maximum ratio between a desired signal and undesired signals.

It has been heretofore proposed to measure continuously along the length of a well bore the time required for an acoustic impulse to travel over a relatively short earth section such as the section intermediate an acoustic transmitter and an acoustic receiver supported a predetermined distance apart for movement in a well bore. In order to meet the unusual conditions encountered in a bore hole, some operational features of a desirable acoustic logging system appear to be conflicting in nature. For example, the transmitter and receiver must be maintained a fixed distance apart and thus a sturdy coupling member is required. However, substantial direct transmission of sound energy through such coupling member cannot be tolerated. Further, in making measurements of short time intervals it is necessary to utilize acoustic pulses of high energy content in order to assure operation above the level of noise produced as the unit travels through the bore hole and yet there must be sufficient electrostatic and magnetic shielding between the transmitter and receiver to prevent cross-feed, and there must be means provided to assure that signals produced by the receiver correspond in a known degree to energy traveling through the adjacent earth formation.

The present invention relates to a combination including a transmitter and a receiver in which high energy levels may readily be achieved without attendant deleterious cross-feed effects. In a further aspect, the invention relates to the provision of a novel electro-acoustic transducer. In another aspect, the invention relates to the provision of a receiver of low inherent noise but capable of suitable operation while withstanding the bore hole temperatures and pressures ordinarily encountered.

More specifically, in one aspect there is provided an acoustic sensing system having a magnetostrictive transducer and an acoustic receiver wherein the transducer includes a pair of cylinders of magnetostrictive material each having a winding. A cable means including electrical conducting means supports the receiver and the transducer with at least a portion of the conducting means passing through both of the cylinders. Upon excitation of the windings such that the instantaneous magnetic fields in the two cylinders are opposite in sense, substantially zero net field is effective to induce extraneous signals in the conducting means while like dimensional changes are produced in the cylinders, thus providing a system of low inherent noise level. In a further aspect of the invention, a shield disposed about the magnetostrictive transducer forms a short circuited loop responsive to slight differences in the instantaneous values of the magnetic field further to reduce the noise level.

In a still further aspect of the invention, there is provided a combination of a magnetostrictive transducer, transmitter and piezo-electric receiver mechanically coupled together rigidly and yet electrically and acoustically isolated as to permit operation in a bore hole at a relatively high acoustic energy level.

For further objects and advantages of the invention and for a more complete description thereof, reference may now be had to the following description taken in conjunction with the accompanying drawings in which:

Fig. 1 is a view partially in section of a bore hole logging tool;

Fig. 2 is a sectional view of the transmitter of Fig. 1;

Fig. 3 illustrates operation of the system of Fig. 1;

Fig. 4 is a detailed view of the receiver portion of the system of Fig. 1; and

Fig. 5 is a sectional view of the receiver taken along the line 5—5 of Fig. 4.

Referring first to Fig. 1, there is illustrated a portion of a well logging tool, parts of which are illustrated in section. The upper section 10 (supported in a conventional manner by cable means, not shown) may comprise a housing for associated downhole instruments as well as suitable means for attaching the dependent section 11 thereto. The second section 11 is a transmitting unit which includes a suitable source of acoustic waves later to be described. The third section 12 may be termed an insulating section below which there is positioned a receiver unit 13 and, below that, a lower housing unit 14.

The upper housing unit 10 and the lower housing unit 14 are rigidly coupled together by means of a plurality of rods 20. Although only four rods may be seen in Fig. 1, six rods uniformly spaced in a circular configuration have been found to be suitable and provide a rigid coupling structure. The transmitter 11 is positioned near the upper ends of rod 20 and adjacent the housing 10 and is supported by rods 20 in manner later to be described. The transmitter 11 comprises a pair of rings or cylinders 21 and 22 of magnetostrictive material preferably of low magnetic retentivity having the same magnetostrictive coefficient, preferably a positive coefficient. Material which has been found to be the most suitable is known in the art as Vanadium Permendur, comprising approximately 50% iron, 48% cobalt and 2% vanadium.

Each ring has an inner diameter large enough that it may slip easily over rods 20 with substantial clearance. A toroidal coil or winding is provided for each of the cylinders 21 and 22. A first coil, diagrammatically illustrated by the single turn winding 23, is wound in a counterclockwise direction around the core 21 to form a toroidal winding which upon excitation causes the core material to expand. The second winding 24 is wound toroidally around the core 22 in a clockwise direction. One end of each of the coils 23 and 24 is joined as at terminal 25 in such a manner that current applied to the other terminals 26a and 26b of a suitable source 26 flows in opposite relative directions in windings 23 and 24. It is to be understood that the circuit means including terminals 26a and 26b and source 26 are schematic only and in practice will be suitably interconnected through circuit means in the housing section 10 and a well cable with source 29 located at the earth's surface as is well understood by those skilled in the art.

As shown in the sectional view of Fig. 2, the cylinders 21 and 22 with their windings 23 and 24 are mounted closely adjacent each other in an end-to-end array coaxially with the housing 10. They are supported from the rods 20 by a mass of rubber suitably vulcanized to the housing 10a of the upper section 10, to the rods 20 and to the transducer units themselves. In Fig. 1 the vulcanized rubber mounting and outer rubber sheath have been cut away as to expose the transducer unit in detail. However the mounting and sheath are identified by the reference character 30 both at the upper section 10 and at the lower portion of the insulator section 12.

The insulator section includes the rods 20 and a plurality of weights 31 each positioned at uniformly spaced points along the rods 20 to form therewith a filter for acoustic energy. Certain features of a suitable insulator, such as generically indicated by section 12, are described and claimed in co-pending application Serial No. 346,593, now Patent No. 2,757,358, issued July 31, 1956, for Mechanically Coupled Acoustic Well Logging System of John O. Ely, a co-worker of applicant. The insulator is designed to attenuate energy from the transmitter 11 and at the same time be sufficiently sturdy as to transmit unidirectional forces in order to support the receiver 13 and the lower housing 14. The insulator may be considered to be essentially an acoustic low-pass filter and is here in combination with a transmitter 11 which produces high frequency acoustic energy and a receiver particularly designed for detecting such energy.

Referring now to Fig. 3, the system has been illustrated diagrammatically in order to bring out an important feature of operation. It will be seen that if only the first element 21 is energized as by applying a voltage to terminals 23a of coil 23, the resultant magnetic field induces currents in the metallic rods 20. The rods themselves are terminated at their upper ends in a metallic base which in general is difficult to insulate electrically from bore hole fluids. Similarly, the lower ends of rod 20 are terminated in the case or housing 14. Thus there is provided a current loop which includes rod 20, the upper housing (not shown in Fig. 3), the lower housing 14, the bore hole fluids and a section of earth formations. The current path has been diagrammatically illustrated by the line 45. The application of short pulses of electrical energy to the winding 23 causes high order changes of current flow in path 45 which in turn produce unwanted signals in the receiver 13. By adding the second element 22 and a coil, both identical with unit 21 and coil 22, and then connecting the two coils in opposition, the voltage induced in the effective single turn by excitation of a coil on element 22 is opposite in polarity and approximately equal in amplitude to that due to excitation of the first coil and consequently current flow in loop 45 is greatly reduced.

Cross-feed effects may be substantially completely eliminated by adding to the transmitter 11 a highly conductive sheath, such as copper wire screen 27, cylindrical in form and disposed about the periphery of rings 21 and 22 and the windings 23 and 24. Connections 28 and 29 at the ends of the cylindrical screen 27 provide current paths to the metallic case 10a and to the upper end of the first weight 31, respectively. Short circuited loops including screen 27 and connections 28 and 29 are completed through rods 20 and shunt induced current which otherwise would flow the entire length of the rods 20. By means of the foregoing expedients, the receiver 13 may be considered to operate in a region free of unwanted induction.

The unwanted signals other than those above discussed are in most part resultant from "road noise." Stated otherwise, they comprise the detectable sounds generated merely by reason of movement of the unit through the well bore. In accordance with the present invention, a crystal 50, Fig. 4, capable of withstanding high temperatures and pressures, such as a tourmaline crystal, is resiliently mounted as to be in substantial pressure contact with the bore hole fluids and yet substantially insulated from vibrations produced in the bore hole unit itself. More particularly, a thin rubber tube 51, Figs. 4 and 5, encloses the disk-like crystal 50. A fitting 53 is inserted into the upper end of the tube and a clamping ring 54 is affixed to the exterior thereof to form a liquid-tight seal. A plug 55 is threadedly adapted to a suitable opening in the face of the fitting 53. An eyelet 56 is secured to the plug 55. A plurality of eyelets, such as the eyelets 57 and 58, are fastened above eyelet 56 to two or more of the rods 20. Elements such as springs 59 and 60 of high compliance interconnect eyelet 56 and eyelets 57 and 58, thus supporting the crystal 50 and its enclosing rubber sheath.

The rods 20 are secured at their lower ends to a bulkhead member 65. An electrical conductor such as an elongated pin 66 having an enlarged upper end 67 passes through the bulkhead 65 and is insulated therefrom by a truncated conical insulator 68. A fitting 70 is secured as by screws 71 and 72 to the upper face of the bulkhead 65. The fitting is provided with a hollow central cylinder extension 73. The extension 73 is inserted into the lower end of the rubber tube 51, and a clamping ring 74 on the outside of the rubber tube effects a liquid-tight seal therebetween. The rubber tube preferably is fashioned such that the cross section below the crystal 50 is very small. A glass-seal terminal 75 provides a liquid-tight pressure resistant juncture between the hollow interior of the extension 73 and the interior of the rubber enclosure 51. A first conductor 76 is connected at one end to the right hand face of the crystal 50 and at the other end to a ground point 77 on the extension 73. A second conductor 78 is connected at one end to the left hand face of the crystal 50 and at the other end to the upper end of the conductor 75a of the glass-seal terminal 75. A connection 80 is then provided between the lower end of conductor 75a and the enlarged head 67 of conductor 66.

The receiver structure may be assembled in the following manner. The crystal 50 may be first placed midway between the ends of a short section of rubber tubing, preferably of neoprene rubber. The conductors from the crystal are then fastened to the conductor 75a and to terminal 77. The rubber tubing is then drawn over extension 73 and clamped as by ring 74. The fitting 53 and clamping ring 54 are secured at the upper end of the rubber tube 51. A suitable insulating oil is then inserted inside the rubber tube 51 as through the threaded opening in fitting 53. Sufficient pressure may be applied to cause the oil or insulating material to fill completely the portion of the tubing below the crystal and to permit the entrapped air to escape. When the space within the tube is completely occupied by the insulating oil and the crystal, the plug may be screwed therein and springs 59 and 60 fastened to eyelet 56. Since the pressure inside and outside the tube 51 will be equal, the sealing rings 54 and 74 need not be designed to withstand bore hole pressures. However, the glass-seal 75 must seal the interior of the instrument housing 14 from bore hole pressures and therefore is preferably welded or otherwise affixed as by silver solder to the upper face of the extension 73.

Referring again to Fig. 1, it will be seen that the space around the receiver housing 51 is not completely enclosed as is the transmitter 11. Rather the receiver section 13 is open, permitting the bore hole fluids to contact the resilient housing 51 and to apply pressures directly to crystal 50. To provide an electrostatic shield for the crystal 50 there is added a wire mesh 90 in the form of a cylinder which is electrically connected to as well as mechanically supported by the rods 20. A measure of mechanical shielding is thus provided along with electrical shielding.

Electrically, the signals from crystal 50 are applied to an amplifier shown by the symbol 85 which ordinarily will occupy the space inside housing 14. The amplified received signals are then transmitted to the earth's surface by way of a signal channel represented by the conductor 86 which may conveniently be passed through the interior of the tubes 20 to a bore hole cable and thence to a measuring unit 87 at the earth's surface.

Although the conductors pass through the tubes 20 and consequently through the magnetostrictive cylinders 21 and 22, the net inductive coupling to the windings on cylinders 21 and 22 is very small so that the signal channel is substantially unaffected by induction. Thus induced signals and road noise signals are substantially eliminated by the provisions of the present invention.

While the foregoing description has related in large part to a system in which acoustic pulses are utilized in the measurement of the travel time character of earth formations, it is to be understood that the provisions of the present invention are equally applicable to systems utilizing continuous waves as contrasted to discrete pulses. The inductive effects are eliminated and electrostatic and electromagnetic coupling with transmitter and receiver are substantially reduced. While the invention has been described by reference to certain modifications thereof, further modifications may now be apparent to those skilled in the art and it is intended to cover such modifications as fall within the scope of the appended claims.

What is claimed is:

1. An acoustic sensing system comprising a magnetostrictive transducer for translating electrical energy into acoustic energy and a receiver responsive to acoustic energy, said transducer including a pair of cylinders of magnetostrictive material each provided with toroidal windings, cable means for supporting said receiver and said transducer and including electrical signal channels with at least one of said signal channels passing through both of said cylinders, a source of alternating current, circuit means interconnecting said source and said windings for flow of electrical current instantaneously in relatively opposed directions through said windings to maintain at a minimum the voltages induced in said one channel from the resultant magnetic fields in said cylinders while producing the dimensional changes therein for generating an acoustic energy field in media adjacent said cylinders, and means for connecting said one channel to the output of said receiver for transmission of signals from said receiver through said cable singularly indicative of said acoustic field.

2. The combination set forth in claim 1 in which there is provided a short circuited current path looping both of said cylinders to minimize cross feed effects between said toroidal windings and said one channel.

3. The combination set forth in claim 1 in which shielding means of low electrical resistivities encircles both said transducer and said receiver for producing electrical isolation therebetween.

4. In combination a magnetostrictive transducer for translating electrical energy into acoustic energy and including a pair of cylinders of magnetostrictive material, separate toroidal windings for each of said cylinders, cable means for supporting said transducer including electrical conducting means forming a signal channel at least a portion of which passes through both said cylinders, a source of alternating current, and circuit means interconnecting said source and said windings for flow of current from said source instantaneously in relatively opposed directions through said windings to maintain at a minimum the voltages induced in said signal channel by the resultant magnetic fields while producing like dimensional changes in said cylinders for generation of an acoustic energy field in adjacent media.

5. In combination a magnetostrictive transducer for translating electrical energy into acoustic energy and including a pair of identical cylinders of magnetostrictive material having a positive magnetostrictive coefficient, separate toroidal windings for each of said cylinders, cable means for supporting said transducer including electrical conducting means forming a signal channel which passes through both said cylinders, a source of electrical energy, and circuit means interconnecting said source and said windings for flow of current from said source through said windings instantaneously in relatively opposed directions to maintain at a minimum voltages induced in said signal channel by the magnetic fields in said cylinder.

6. In an acoustic well logging system the combination which comprises a magnetostrictive transducer supported for movement along a bore hole immersed in bore hole fluids and characterized by a pair of cylinders of magnetostrictive material each having a toroidal winding, a source of electrical energy, circuit means interconnecting said windings and said source and adapted to direct flow of current from said source through said windings in instantaneously opposed senses to produce relatively opposed magnetic fields in said cylinders, the resultant dimensional changes in said cylinders producing acoustic energy in said fluids, a receiver of said acoustic energy, a measuring system, and a signal channel extending from said receiver to said measuring system and substantially equally inductively coupled to both said toroidal windings whereby the net voltage induced in said channel by inductive coupling to said toroidal windings is negligible.

7. In an acoustic well logging system the combination which comprises a magnetostrictive transducer supported for movement along a bore hole immersed in bore hole fluids and characterized by a pair of cylinders of magnetostrictive material each having a toroidal winding, a source of electrical energy, circuit means interconnecting said windings and said source and adapted to direct flow of current from said source through said windings in instantaneously opposed senses to produce relatively opposed magnetic fields in said cylinders, the resultant dimentional changes in said cylinders producing acoustic energy in said fluids, a receiver of said acoustic energy, a measuring system, a plurality of rigid metallic rods supporting said receiver a predetermined distance from said cylinders with said rods passing through both said cylinders, and conductors forming a signal channel from said receiver to said measuring system and passing through said rods whereby the net voltage induced in said rods and said channel by inductive coupling to said toroidal windings is negligible.

8. In an acoustic well logging system the combination which comprises a piezo-electric element, a liquid filled resilient sac enclosing said element and positioned in contact with bore hole fluids, a plurality of rigid conductive members oriented in a symmetrical array about and in a supporting relation to said sac, a magnetostrictive transducer including a pair of cylinders of magnetostrictive material encircling said members and supported therefrom a predetermined distance from said piezo-electric element, toroidal windings for each of said cylinders, a source of electrical energy, circuit means interconnecting said windings and said source and adapted to direct flow of current from said source through said windings instantaneously in opposed senses to produce relatively opposed magnetic fields in said cylinders whereby the inductive coupling to said elongated members is negligible, said current flow producing dimensional changes in said cylinders for the production of acoustic energy in said fluids, and a plurality of weights uniformly spaced along and supported by said elongated conductive members to form therewith an acoustic filter to prevent transmission of the acoustic energy from said transducer directly through said conductive members to said piezo-electric element.

9. In an acoustic well logging system the combination of a first transducer comprising a piezo-electric element, a liquid filled resilient sac enclosing said element and positioned in contact with bore hole fluids, a plurality of rigid conductive members oriented in a symmetrical array about and in a supporting relation to said sac, a second transducer including a pair of cylinders of magnetostrictive material encircling said members and supported therefrom a predetermined distance from said piezo-electric element, a toroidal winding for each of said cylinders, a source of electrical energy, circuit means interconnecting said windings and said source and adapted to direct flow of current from said source through said windings instantaneously in opposed senses to produce relatively opposed magnetic fields in said cylinders whereby the inductive coupling to said elongated members is negligible, said current flow producing dimensional changes in said cylinders for the production of acoustic energy in said fluids, a plurality of weights uniformly spaced along and supported by said elongated conductive members to form therewith an acoustic filter to prevent transmission of the acoustic energy from said transducer directly through said conductive members to said piezo-electric element, a cylinder of low electrical resistance encircling said first transducer and connected at its ends to said members to form a short circuited shield around said first transducer and a cylinder of low electrical resistance encircling said first transducer and connected at its ends to said elements to form a low resistance short circuited path for currents proportional to the difference between said opposed magnetic fields.

10. In a well logging system in which acoustic waves are generated in formations adjacent a drill hole, the improvement which comprises a pair of toroidal transducer elements each having a central opening and a winding thereon, means for energizing windings of said transducer elements to produce magnetic fields instantaneously opposite each other, a receiver spaced from the point of generation of the acoustic waves, and a rigid coupling extending from said receiver through the openings in said toroidal transducer elements at said point of generation whereby substantially zero net field is effective on said rigid coupling upon excitation of said transducer elements.

References Cited in the file of this patent

UNITED STATES PATENTS

| | | |
|---|---|---|
| 1,766,473 | Wente | June 24, 1930 |
| 2,265,786 | Athy et al. | Dec. 9, 1941 |
| 2,490,273 | Kean | Dec. 6, 1949 |
| 2,530,971 | Kean | Nov. 21, 1950 |

OTHER REFERENCES

Hueter and Bolt, "Sonics," published by John Wiley & Sons, Inc., New York, 1955, pages 194–195.

UNITED STATES PATENT OFFICE
CERTIFICATE OF CORRECTION

Patent No. 2,834,421                                                    May 13, 1958

Gerald O. Summers

It is hereby certified that error appears in the printed specification of the above numbered patent requiring correction and that the said Letters Patent should read as corrected below.

Column 2, line 59, after "source" strike out "29"; column 5, line 31, for "the dimensional" read -- like dimensional --.

Signed and sealed this 3rd day of February 1959.

(SEAL)

Attest:

KARL H. AXLINE                                                       ROBERT C. WATSON

Attesting Officer                                                  Commissioner of Patents